United States Patent
Jamieson

[19]

[11] Patent Number: 5,918,193
[45] Date of Patent: *Jun. 29, 1999

[54] CLONABLE MEASUREMENT DISPLAY INSTRUMENT

[75] Inventor: Brian Thomas Jamieson, Meridan, Conn.

[73] Assignee: Prime Technology, Inc., North Branford, Conn.

[*] Notice: This patent is subject to a terminal disclaimer.

[21] Appl. No.: 08/876,974

[22] Filed: Jun. 16, 1997

[51] Int. Cl.⁶ ..................................................... G06F 17/00
[52] U.S. Cl. ................................ 702/91; 702/67; 702/100
[58] Field of Search .......................... 702/55, 67, 90–91, 702/100, 33, 50; 364/723, 132; 345/35, 39

[56] References Cited

U.S. PATENT DOCUMENTS

| | | | |
|---|---|---|---|
| 4,716,536 | 12/1987 | Blanchard | 702/100 |
| 4,926,360 | 5/1990 | Spink, Jr. | 702/88 |
| 5,265,201 | 11/1993 | Cabot et al. | 364/132 |
| 5,325,314 | 6/1994 | Lippmann et al. | 702/88 |
| 5,751,611 | 5/1998 | Jamieson | 702/67 |

OTHER PUBLICATIONS

Instrumentation Reference and Catalogue—Test and Measurement Industrial Automation; National Instruments Copyright 1996; Foundation Fieldbus Interface For PCM-CIA, pp. 6–31 to 6–36, 1997.

*Primary Examiner*—John Barlow
*Assistant Examiner*—Bryan Bui
*Attorney, Agent, or Firm*—Lackenbach Siegel Marzullo Aronson & Greenspan, P.C.

[57] ABSTRACT

A clonable display device includes an input port for receiving digital data representative of non-linear input variable. Computer CPU is connected to the input port for receiving digital data, and a linear display having an input connected to the computer CPU is provided for providing an output indication which varies linearly with the signal applied to the display. Non-volatile memory is connected to the computer CPU for storing a finite set of predetermined calibration points.

20 Claims, 6 Drawing Sheets

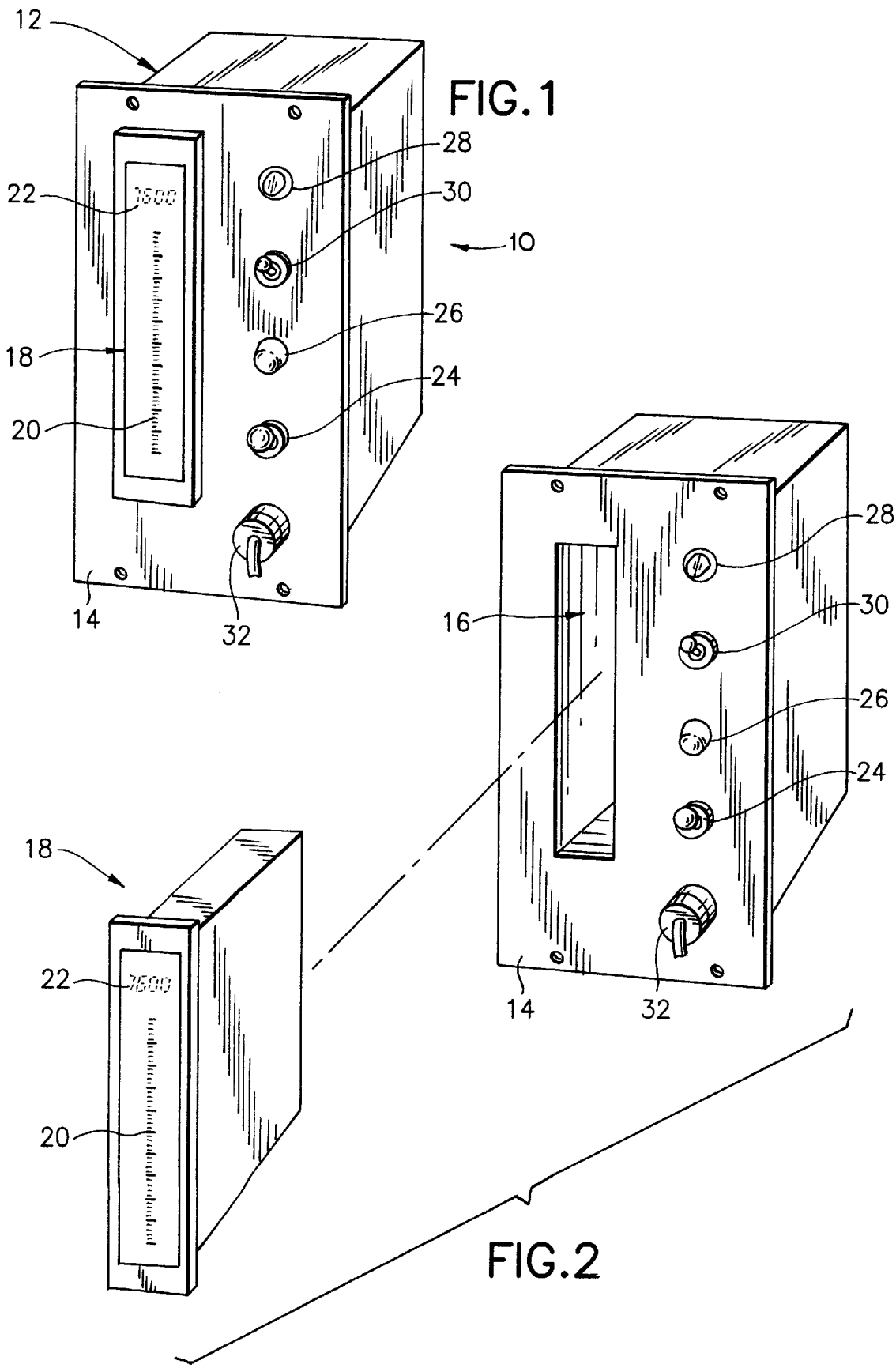

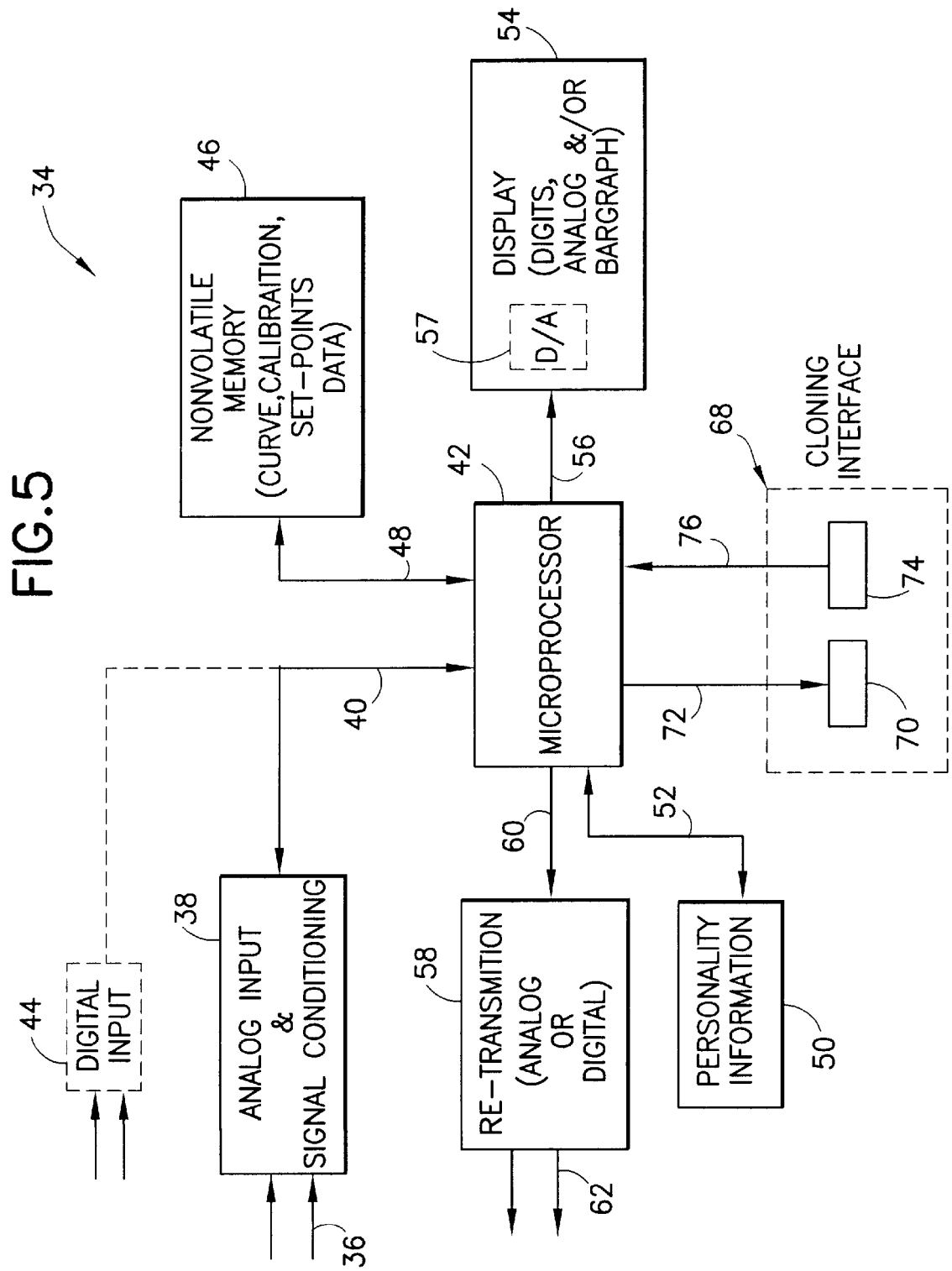

CLONABLE MEASUREMENT DISPLAY INSTRUMENT

BACKGROUND OF THE INVENTION

1. Field of the Invention

The present invention generally relates to meter displays and, more specifically, to a clonable measurement display instrument, provided with calibration data, for replicating a like display instrument also having the same calibration data.

2. Description of the Prior Art

Numerous devices and liquid level gauges have been devised for measuring and displaying the level of a liquid within a storage tank reservoir. The prior art devices have involved numerous techniques for monitoring or physically detecting the level of the liquid in the tank reservoir, including the use of sight gauges, electro-optical systems using light types, external and color lights, lenses, prisms and filters, and fiber optics. These are generally complex and expensive systems. Examples of liquid measuring systems are disclosed, for example, in U.S. Pat. Nos. 4,296,472; 4,382,382, 4,487,065; 4,598,742; 4,601,201; 4,644,177; 4,745,293; 4,857,894, 4,870,292; 4,908,783; 4,994,682; 5,124,933; 5,245,869; 5,247,833 and 5,351,036.

Tanks of ships tend to be irregular. This is in contrast to an ideal tank, for purposes of measurement, which is rectangular or cylindrical. The volume of a simple tank is generally equal to the base area times the height. With the ideal tank the cross-sectional area of the tank is constant along the height, so that the height of the liquid is directly proportional to the volume taken up by the liquid in the tank. Any simple sensor can then be used to translate the height of the liquid and correlate this information to the quantity of fluid in the tank. Most tanks used aboard ships, however, are not ideal and they tend to follow the shape of the hull. Frequently, ducts, pipes, and other three dimensional spaces or regions are contained within the tank which are not used to contain fluid. This further complicates the geometric configuration of the tank for purposes of liquid level monitoring. Therefore, in most tanks aboard ships, a tank response curve is generally not linear, and the height of the column of liquid is not directly proportional to the volume of the liquid in the tank. Not only does one have to contend with the shape of a hull, but also the exact position of the tank level sensor. The volume inside tanks through which pipes, ducts, gates, crawl spaces, tunnels or the like extend is quite common and, as suggested, complicates the liquid level measurements.

In view of the foregoing, the tank response curve of an ideal tank is generally a straight line which correlates a given height of the liquid to the volume in the tank. One of the greatest problems of the older systems is inaccuracy, and tank level readings could not be trusted. It is for this reason that certain critical tank level readings were performed manually. Such inaccuracies had been introduced by the meters themselves. If a meter had a perfect linear scale, the error that just the instrument introduced is 2%, the error introduced by electronics, such as voltage source drift, being negligible.

As indicated, aboard a ship, most liquid level scales that are used are non-linear. There are several errors that come into play. The system is calibrated by simulating several fluid heights corresponding to known fluid volumes. At each height, the voltmeter is marked accordingly. The resulting response curve defines the conversion transform for the particular tank involved. A plot of such response curves indicates, however, that considerable amounts of error can be introduced at points along steep slopes of the curve where small changes in height of the fluid surface produce large changes in the volume or liquid levels.

Considering the human reading errors, meter errors and calibration errors, the total error can be significant.

On a conventional meter scale, one can record a limited number of "break points". This number is limited because physically one can only place a limited amount of nomenclature on the display scale. Such nomenclature is also usually represented in round numbers (0, 10, 20, 30 etc.), even though the outcome of the calibration procedure may not have produced round numbers. Combined, this introduces a considerable error.

While numerous techniques for calibrating of electronic instrumentation have been disclosed, these systems are typically designed for linearizing non-linear transducers which monitor some variable or parameter (e.g. thermistor or other system circuit components). See, for example, U.S. Pat. No. 4,253,155, which is concerned with non-linearities of system circuit components generally, and U.S. Pat. No. 4,713,783, which is concerned with thermistors specifically.

While fluid level measurements are important, on ships and elsewhere, specially calibrated meters are used in numerous other applications, including displaying rudder control, pressures, temperatures, etc. Many of these meters must be loaded with special calibration data. Such calibration data is typically stored in a memory device. However, when a meter containing such calibration data becomes defective and must be replaced it has up to now been a problem to do so since each meter is, in essence, customized, to perform a very specific function. Therefore, such a meter is not normally interchangeable with another meter that may be available or with an "off the shelf" meter since these do not contain the special calibration data which customizes the meter to perform the desired display function for a non-linear application.

Specific examples of patents used for linearizing non-linear variables are discussed in U.S. Pat. No. 5,751,611, assigned to the assignee of the present application.

Numerous patents disclose redundant systems with automatic change-over from a defective component to a backup unit. However, such arrangements normally require that multiple similar dedicated units be maintained in place. Thus, for example, in U.S. Pat. No. 4,864,842, a method and system are disclosed for transferring calibration data between calibrated measurement instruments. In this patent, experimentally determined calibration curves are stored, which calibration data can be transferred to a plurality of dedicated field gauges. While this avoids the necessity of individually calibrating each gauge each time calibration is necessary, the field gauges must initially be cross-related to a master gauge. At a later time, when a new calibration is necessary, the master gauge is calibrated using carefully prepared samples of a test material. Using the experimentally derived calibration curves with the cross relation data provides calibration data for the field gauges.

In. U.S. Pat. No. 3,928,830, a diagnostic system is disclosed for field replaceable units, in which the system monitors functional units. In the event of failure in the operation of the system, as for example a data error, the system checks its monitors for an indication of an out-of-power condition or failure in the module or field replaceable unit inside the functional unit. The system has the capability of managing itself to deactivate a functional unit when failure sensors indicate a field replaceable unit in the functional unit has failed.

Master/slave systems typically have one microprocessor which acts as a master which provides overall system control and other microprocessors which act as responsive slaves for controlling specific functions. A system for simultaneously loading a program to master computer memory devices and corresponding slave computer memory devices is disclosed in U.S. Pat. No. 5,187,794. Thus, the use of a microprocessor to exchange data with a host station or a remotely located device is known. However, the use of two identical microprocessor-based devices in which either of the units may act as a master or slave unit in order to replicate the data stored in non-volatile memory to the other unit to, in essence, clone the first unit and make it completely interchangeable with the second unit is not disclosed in this patent. U.S. Pat. No. 4,700,292 discloses an interface circuit arrangement for transferring data from a master processor to a slave processor when the master malfunctions. The role of the malfunctioning microprocessor is assigned to its associated microprocessor while diagnostic operations are carried out to trace and correct the defect. However, this patent is mostly concerned with the efficiency of the data transfer of large quantities of data in mass memory.

Other examples of redundant-type systems include U.S. Pat. No. 4,823,256 which discloses a reconfigurable dual processor system; U.S. Pat. No. 4,941,087 which discloses a system for bumpless changeover between active units and backup units by establishing rollback points and logging write and read operations; and U.S. Pat. No. 4,797,884 which discloses for a redundant device control unit. In the last mentioned patent, two nominally identical electronic devices are connected in a manner such that one of the devices functions as an active device in the system and the other device functions as a standby device, in which each device includes a back-up control unit including an optical fiber link for establishing communications between the device and the other nominal or identical device.

It is also common to provide a system backup with microprocessor-based devices. For such backup operation, the control program and/or data is downloaded from one device to another. The backup program performs basically the same functions as the initial program. Switch over to the backup program occurs either automatically in response to a monitor, or manually by an operator when an error has been detected. Backup control systems are disclosed in U.S. Pat. Nos. 4,691,315 and 5,313,385.

SUMMARY OF THE INVENTION

Accordingly it is an object of the present invention to provide a display device or meter which can be readily replicated or cloned to contain the same calibration data as the original display device or meter.

It is another object of the present invention to provide a clonable display device which is simple and inexpensive to manufacture.

It is still another object of the present invention to provide display devices in the form of generic or "off the shelf" meters which do not initially have calibration data stored in them but which can receive and store the necessary data from a calibrated meter so that these generic meters can be used to replace the calibrated meters when they become defective, all these meters being interchangeable with each other after cloning by downloading of calibration data.

It is yet another object of the present invention to provide a display device as suggested in the previous objects which avoids the use of specially calibrated meters which may be difficult to replace under certain conditions.

It is yet a further object of the present invention to provide cloning techniques of the type suggested, particularly in connection with panel meters or measurement display devices of the type that may be used for displaying levels of liquids in tanks, pressure changes, temperatures, or the like.

It is a further object of the present invention to provide a clonable display device of the type aforementioned which does not require the use of external equipment, such as an external CPU of the type typically used in a laptop or other general purpose computer.

It is still a further object of the present invention to provide a clonable display device in which the display device itself contains the necessary elements or components for providing the cloning function and for transferring mass data from one non-volatile memory in one display device to another.

A clonable measurement display instrument in accordance with the present invention for linearly displaying a non-linear input variable at a number of n points over a finite range comprises input means for receiving digital data representative of a non-linear input variable. Computer means is provided connected to said input means for receiving the digital data. A substantially linear display is provided which has a display input connected to said computer means for providing an output indication which varies linearly with the signal applied to the display input. A non-volatile memory means is connected to said computer means for storing a finite set of pre-determined calibration points n of correlated input/output points $(x_n, y_n)$ which together define a conversion function for converting a given input $(x_n)$ at any given point $(x_n, y_n)$ to an associated output $(y_n)$. A cloning interface means is provided which cooperates with said microprocessor means for selectively establishing a signal path to said non-volatile memory means. Said microprocessor means is programmed to selectively upload from or download to another like display device at least one of said finite sets of predetermined numbers n through said cloning interface means. In this manner, the data stored in any like clonable display device can be shared with other such devices and any such device can be replaced by any such display device which has been cloned by the downloading of the desired calibration data thereto.

The method, in accordance with the present invention, is used to create a clone of a measurement display instrument in which the instrument and its clone are each provided with a microprocessor, a non-volatile memory and a data interface for transfer of data to or from the memory under the control of the associated microprocessor. The method comprises the steps of powering up the instrument to be cloned. The data interfaces of the instrument to be cloned are connected to each other, this powering up the clone. An upload command is sent by the clone to the instrument upon being powered up. The interfaces of the instrument and the clone are set for data transfer upon receipt of the upload command. Data is then downloaded from the non-volatile memory of the instrument to the non-volatile memory of the clone.

BRIEF DESCRIPTION OF THE DRAWINGS

Other objects and advantages of the present invention will become apparent from the following detailed description of its preferred embodiment when taken in conjunction with the drawings, as follows:

FIG. 1 is a perspective view of a meter assembly which incorporates a display device in accordance with the present invention;

FIG. 2 is an exploded view of the meter console shown in FIG. 1, illustrating the display device of the present invention removed from an associated slot or compartment in the console;

FIG. 5 is a block diagram illustrating the basic electronic components or elements of the display device in accordance with the present invention;

DETAILED DESCRIPTION OF A PREFERRED EMBODIMENT

Figure 3:
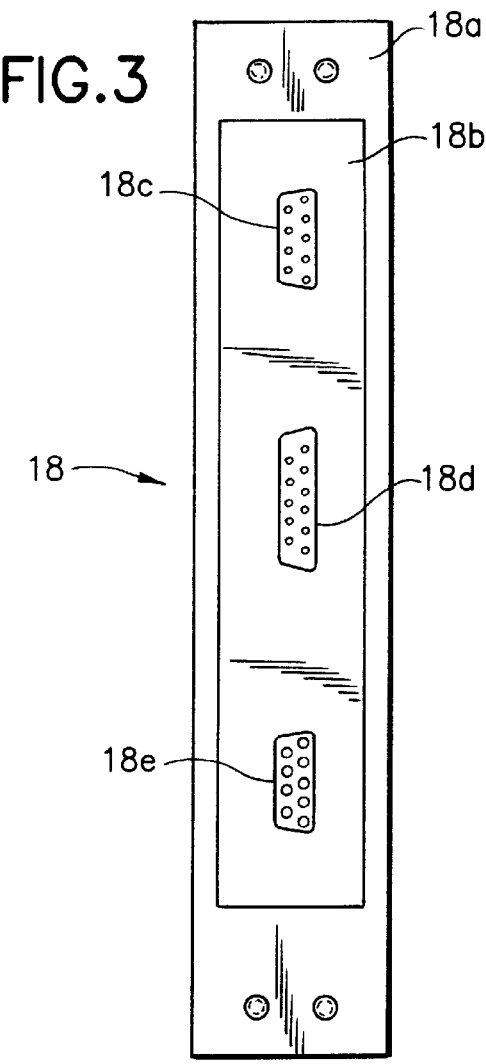
FIG. 3 is a rear elevational view of the display device or meter shown in FIGS. 1 and 2, illustrating the various interface connectors for the device.

Referring now specifically to the Figures, in which identical or similar parts are designated by the same reference numerals throughout, and first referring to FIGS. 1 and 2, a meter assembly embodying the present invention is generally designated by the reference numeral 10. The meter assembly 10 is generally of the type used for tank level receivers. However, the meter assembly 10 can also be used in many other applications, including monitoring rudder positions, pressures, temperatures, etc. The meter assembly 10 is configured and dimensioned to fit into existing instrument control panels on ships, utility control centers and the like. The physical dimensions and placement of connectors are preferably selected to render the meter assembly 10 completely compatible with existing standards in the industry in which the device is to be used. However, the environment for the present invention is not critical, and the invention can be used to fit and retrofit naval vessels of all types, in control centers of process facilities, and the like.

The meter assembly 10 includes a housing 12 which includes a front panel 14. The front panel 14 includes an opening or slot 16 dimensioned to receive a display device 18, which incorporates the present invention. However, the display device 18 may be mounted on the front panel 14, or may be integral therewith. The position or location of the display device 18 is not critical, and it may be arranged in any conventional manner which is consistent with the intended use or application. While not critical, the meter assembly 10 is preferably provided with a power switch 24 on the panel 14, as well as a power light 26. An alarm circuit and associated alarm light 28 is advantageously provided for signaling an alarm condition when the meter assembly reads a measured value above or beyond pre-selected threshold levels. An optional "audio off" switch 30 may be provided to control whether an audio alarm is issued contemporaneously with the visual alarm provided by the alarm light 28.

In order to provide ready access to and convenience for changing fuses, a fuse holder 32 is preferably likewise provided on the front panel 14.

Referring to FIG. 2, the front panel 14 and assembly housing 12 are provided with a slot or compartment 16 which is dimensioned to receive a removable meter or display device which incorporates the important features of the present invention. The display device 18 includes a front face 18a on which there is provided an LED bar scale 20 and, preferably, also a digital display 22 which provides a reading which corresponds to the reading on the bar scale 20. It is contemplated that the bar scale 20 be a linear scale, preferably marked or labeled with suitable indicia to designate percentages representing, for example, the extent to which a tank or reservoir is filled to capacity. Thus, when the tank or reservoir is empty, the bar scale 20, as well as the digital scale 22, show 0%, while a full tank or reservoir would provide a bar scale reading and a digital reading corresponding to 100%.

Referring to FIG. 3, the rear of the display device 18 is illustrated as having a back wall 18b on which three multi-pin connectors 18c–18e are mounted. The specific connectors used are not critical. The connector 18c is a first connector through which power for the display device or meter is supplied. Depending on the number of pins provided on the connector 18c, the same connector may also be used for transfer of data to or from the display device. A second connector 18d is a personality connector, which will be more fully explained hereafter.

Connector 18e represents a cloning interface connector, which may be used for cloning the measurement characteristics or parameters within the display device 18 to another like display device.

Figure 4:
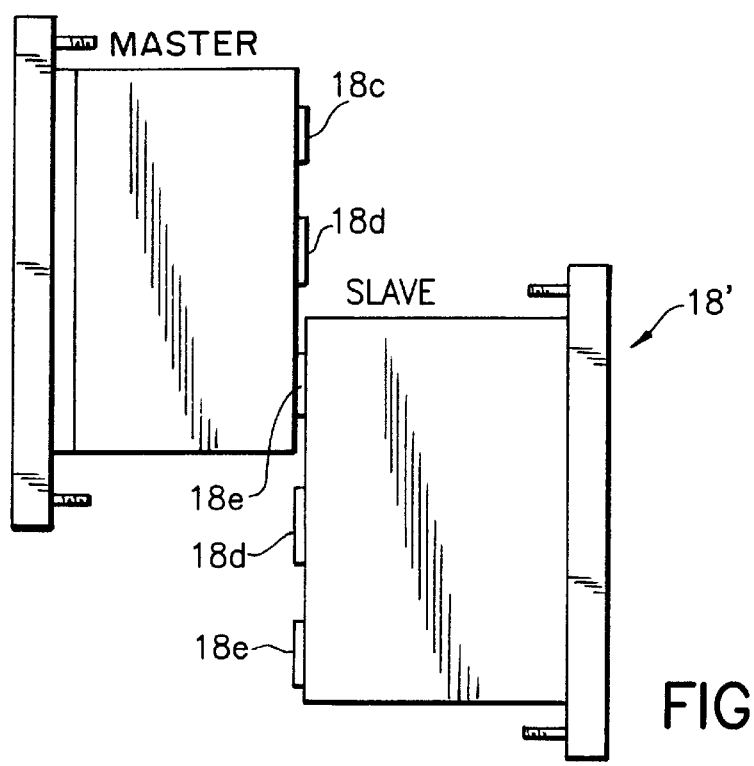
FIG. 4 is a side elevational view of a display device or meter as illustrated in FIGS. 1–3, as mated to another like meter for purposes of cloning by transferring data in non-volatile memory.

In FIG. 4, a master display device 18 is illustrated electrically connected to a slave display device 18'. In this connection, it is pointed out that the connectors 18c and 18e are of the same configuration but of different gender. Thus, for example, the connector 18c is a male connector, while the connector 18e is a female connector. In order to clone the slave display device 18' to have the same display parameters or characteristics as the master display device 18, the male and female connectors of the two units are mated, as suggested in FIG. 4, and the conversion data for linearly displaying a non-linear input variable is downloaded into the memory of the slave unit 18'. Once the slave unit has been cloned, it can achieve the same benefits and advantages by linearly displaying a non-linear input variable in accordance with the present invention.

In FIG. 5, there is illustrated a typical circuit 34 for the meter device. The device includes input means 36 for receiving data representative of a non-linear input variable. When such data 36 is in analog form, a suitable signal conditioning circuit 38 such as an analog-to-digital converter (A/D)) may be used for converting the analog data into digital data and applying the same, by means of line 40, to a microprocessor 42. Where the input data is initially in digital form, such as suggested by the reference numeral 44, the analog signal conditioning unit 38 may be omitted.

The microprocessor 42 is connected to a non-volatile memory (Novram) 46 connected to the microprocessor 42 by means of line 48 for storing a finite set of predetermined number n of correlated input/output points $(x_n, y_n)$ which together define a conversion function for converting an input $(x_n)$ at any given point $(x_n, y_n)$ to an associated output $(y_n)$. For reasons which will become evident from the disclosure, the memory 46 is preferably arranged to store a plurality of finite sets of predetermined correlated input/output points $(x_n, y_n)$, each defining a specific conversion function representative of an associated non-linear input variable.

Where the memory 46 stores a plurality of finite sets of predetermined input/output points, the microprocessor 42 may be connected to a personality connector 50, by means of line 52, which may be connected and disconnected from the microprocessor 42. The personality connector 50 may be a male or female multiple pin connector or the "personality" may be the arrangement of the conductors in a harness of conductors connected to the microprocessor 42. The personality connector 50 is programmed to convey a predetermined code to the microprocessor 42, which is programmed to identify the code and select a desired set of correlated input/output points for any given application. Therefore, if each finite set of predetermined correlated input/output points $(x_n, y_n)$ represents a given fluid tank or reservoir, the microprocessor 42 will apply that finite set of points which corresponds to the selected tank or reservoir for linearizing the non-linear input variable parameters from a sensor in the tank into a linear display output.

The personality connector 50 provides the means of selecting the appropriate curve data. The Novram may be, for example, a 2048×8 bit device, which can store 512 different linear curves (4 locations per curve, for zero and full scale values), 1 curve with 511 different input/output pairs (4 locations per pair). Of course, any number of curves in between the extremes is permissible. Up to 256 different curves, in a minimal system, may be programmed into a 9 pin personality connector by grounding selected pins on the mating connector. The processor will read a binary number between 0 and 255 which corresponds to a particular lookup table.

The microprocessor 42 is connected to a display 54 which is substantially linear in the sense that the output displayed substantially corresponds to the input signal on line 56, and the display 54 itself does not introduce any significant or noticeable non-linearities. As discussed in connection with the display device 18 in FIG. 2, the meter or display device 18 preferably includes a linear bar scale as well as a digital display. The same is true for the display 54, both digital and bar displays being driven by signals generated by the microprocessor 42. The display 54 may also be analog, in which case a D/A converter 57 has to be provided to convert the digital data supplied by the microprocessor 42 on the line 56 to an analog signal.

The microprocessor 42 is also preferably programmed to optimally provide retransmission of linearized data, in digital or analog form, to a remote location where it can be entered into, for example, a "dumb" display which does not include the microprocessor 42 and other components illustrated in FIG. 5 or it can be downloaded into a "master" or central data processing unit where it can further be processed and/or stored for later use or evaluation.

As suggested in FIGS. 3 and 4, the display circuit 34 has a cloning interface 68 which includes a male connector 70 connected to the microprocessor 42 by line 72 and a female connector 74 connected to the microprocessor 42 by means of line 76. The appropriate connector 70 or 74 will be used depending on whether the display device or meter 18 is used as a master or a slave for cloning purposes.

Figure 7:
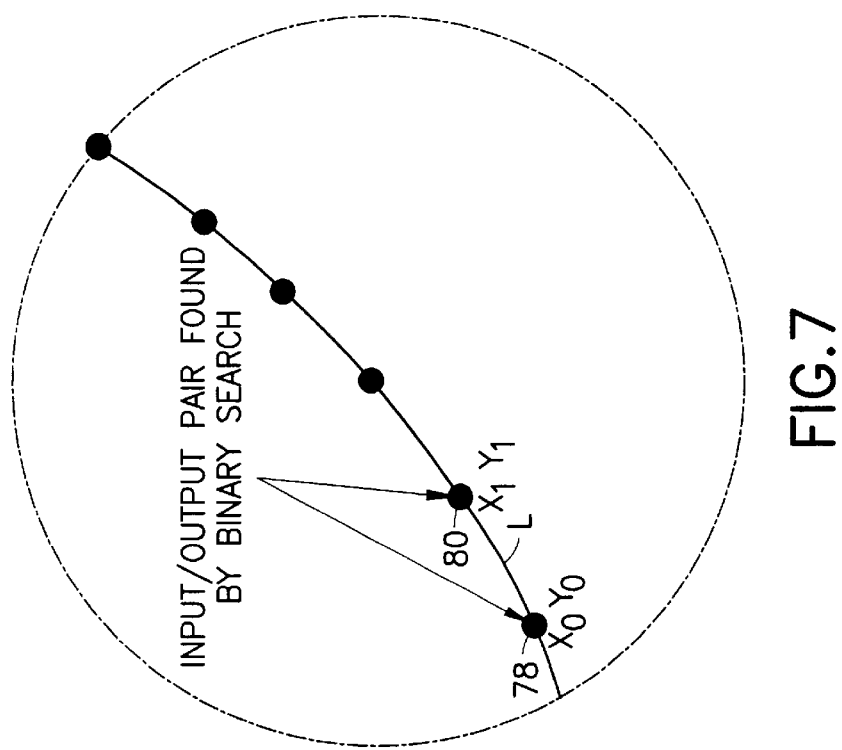
FIG. 7 is a portion of the plot shown in FIG. 6, showing the detail enclosed within the circle in FIG. 6.
Figure 6:
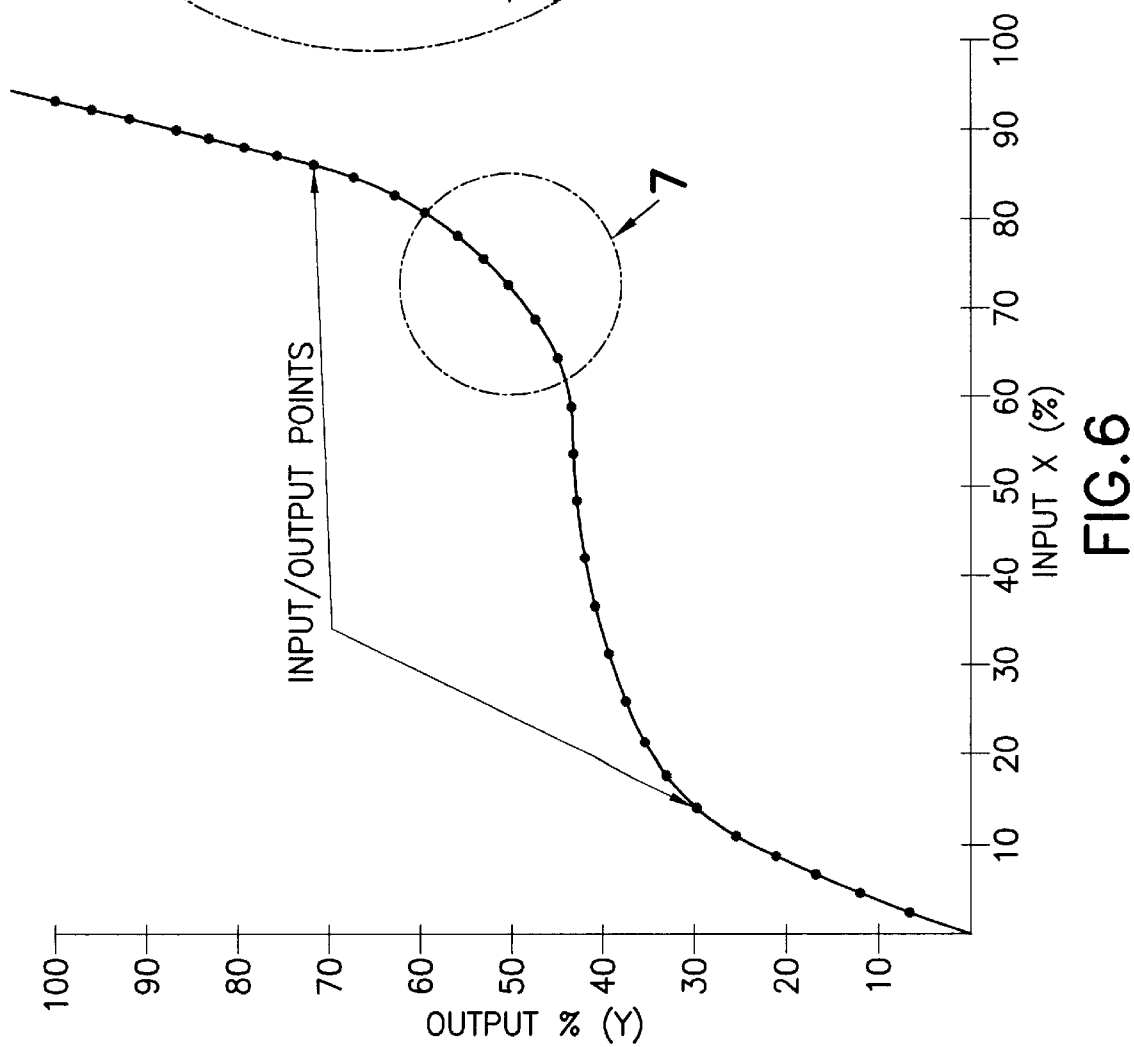
FIG. 6 is a graphic representation in the form of a plot illustrating the transfer or conversion function for converting a non-linear input variable to a linear output variable.

Referring to FIGS. 6 and 7, the input/output points $(x_n, y_n)$ define or plot a conversion curve which relates the percentage of the input signal to an output percentage. Each scale varies from 0 to 100%. Clearly, when the input is 0%, the output is likewise 0%. Also, when the input percent is 100%, so is the output 100% percent. However, aside from these trivial conditions where the storage tank or reservoir is either empty or full, the intermediate points follow a non-linear curve which is empirically obtained. The present invention envisions fewer or more points than shown. However, clearly, the more points that are actually obtained, the more accuracy that the meter will provide.

An important feature of the present invention is that the display device 18 of the present invention can provide a linear display of a non-linear input variable at an infinite number of input points, even though there are a limited or finite number of actual points derived from test data. To significantly increase the accuracy of the conversion or transfer function, the actual input quantity, measured along the "x" axis is used to find the two adjacent points on the curve between which the x value is situated. Referring to FIG. 7, two adjacent points 78, 80 are shown and respectively designated by the coordinates $x_0$, $y_0$ and $x_1$, $y_1$. If a given input parameter defines an input or x quantity which is between the two points 78, 80, the microprocessor makes the suitable calculation and determines that the desired quantity is between the two points 78, 80. Therefore, for a given input $(x_n)$ at any given point $(x_n, y_n)$ there is an associated output $(y_n)$. Each of the two adjacent points $(x_0, y_0)$ and $(x_1, y_1)$ define a straight line segment L. The microprocessor 42 is programmed to interpolate for any given input x between the input two points $(x_0, x_1)$ to provide an output (y) between associated output points $(y_0, y_1)$ by making the following computation:

$$y = \frac{(x - x_0)(y_1 - y_0)}{x_1 - x_0} + y_0$$

Therefore, unlike in U.S. Pat. No. 5,325,314 which requires two separate memories for storing both point sets and slopes, the present invention merely requires a single memory for storing the set point data.

The logical operations for the microprocessor 42 to provide the desired curve fitting is described in U.S. Pat. No. 5,751,611, assigned to Prime Technology, Inc., also the assignee of the subject application.

Figure 8:
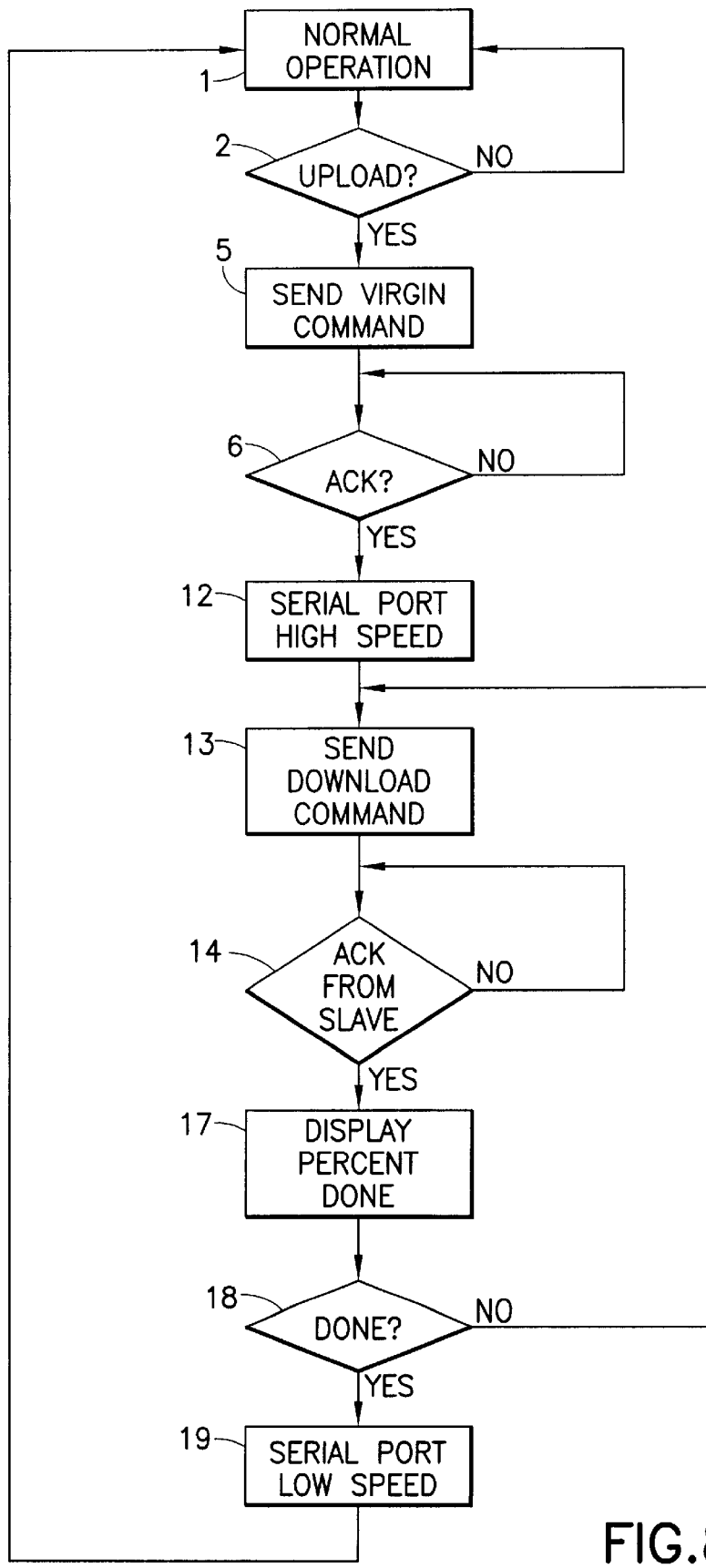
FIG. 8 is a flow chart showing the sequence of programmed operations performed in a master display device or meter unit in accordance with the invention.
Figure 9:
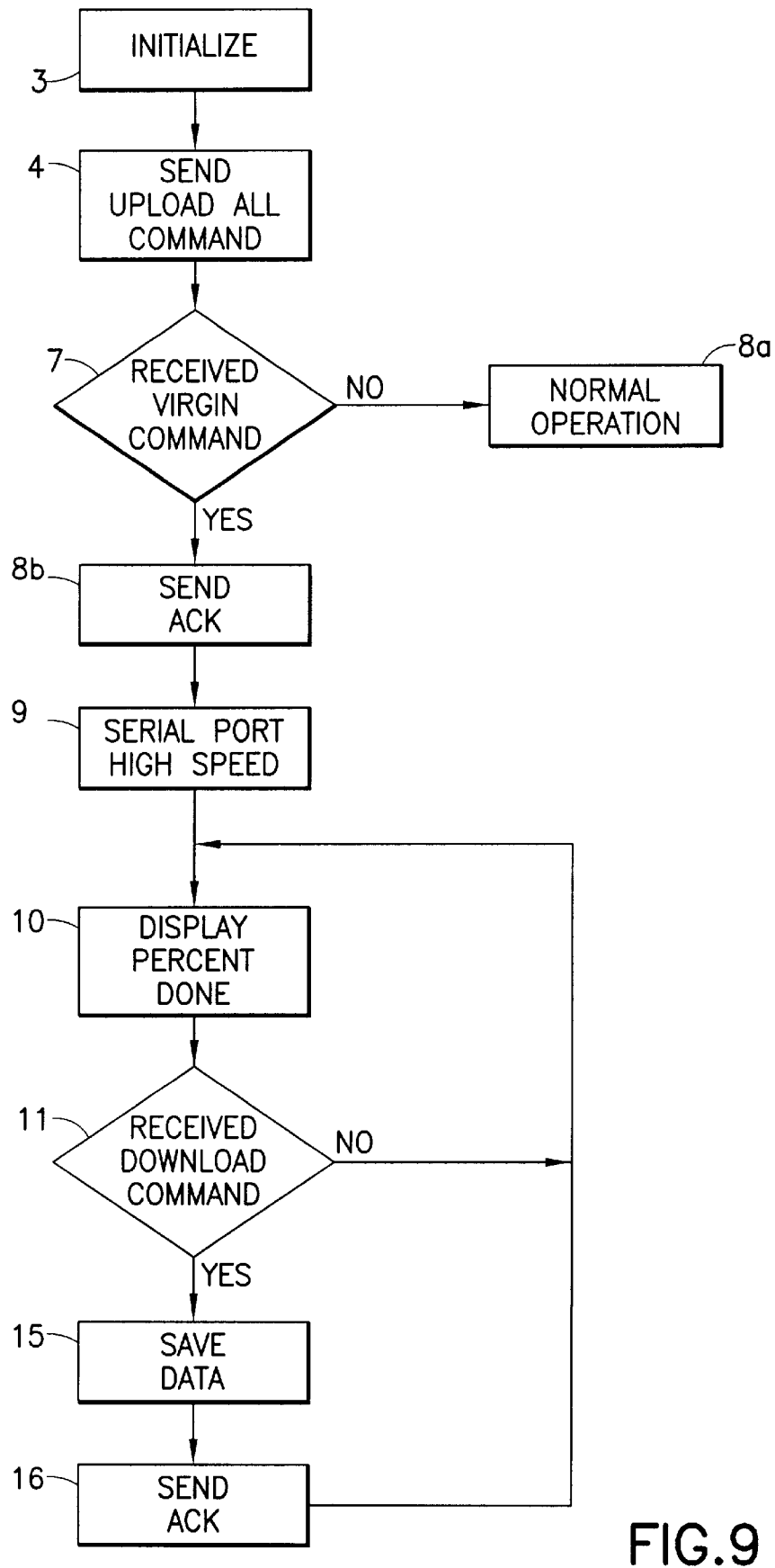
FIG. 9 is a flow chart showing the sequence of programmed operations performed in a slave display device or meter unit in accordance with the invention, the sequences shown in FIGS. 8 and 9 enabling master and slave units to download data to the slave units and thereby clone the same.

FIGS. 8 and 9 are flow charts showing the sequence of programmed operations performed by the microprocessors 42, respectively in the master and slave units, for replicating a slave unit to become a duplicate or "clone" of the master unit, containing the identical calibration data so that the slave unit can be used to replace the master should the master unit become defective.

The master 18 is referred to as the unit that contains the information which is to be duplicated, and the slave 18' is the instrument capable of accepting information sent by the master. When units are placed side by side and the master is in the powered-up mode, at S1, the slave is un-powered.

Generally, as suggested in FIG. 4, when a clone is to be created, a slave unit 18' is connected to master unit 18 by connecting the respective connectors or interfaces 18c, 18e. At the beginning of the cloning procedure the master unit 18 is normally already powered up and running—exhibiting normal operation. When cloning directly to another instrument (meter-to-meter cloning), the entire contents in the memory of the master is transferred to the "slave" in one operation.

When the slave unit 18' (or any unit of the same type) is powered up, at S2, it sends a command, at S3, on the serial output (an inquiry) to see if another unit (master) is connected. This is known as the "M" command ("M" signifying master). The master is programmed to detect whether an "M" command is received at S4. So long as such a command is not received, the master continues its normal operation at S1. However, when an "M" command is received at S4, the master sends a "V" command (signifying virgin) at S5 which the slave is programmed to detect at S6. This command sets a flag, in the slave instrument. If the slave unit does not receive the expected "V" command, then normal operation proceeds at S7. If the virgin command is received at S6, the slave sends an acknowledge at S8 and waits for the master to send an acknowledge at S9. Then, the slave sends an "upload all" command to the master at S10 and places itself into a "download all" mode and waits for data. The master then proceeds to send the entire contents of its non-volatile RAM (Novram) to the slave 18'.

The master calculates the number of eight-byte records that are to be sent to the slave. Data transfer is done in eight-byte chunks. A memory array capable of storing 64 k-bytes of information may be used, and only the necessary information transmitted. The master will send a two-byte record at S11 to the slave which will represent the number of eight byte records to be transmitted. The master will then wait for an acknowledge at S12 from the slave at S13. The master will then begin to sequentially read its non-volatile memory and send it to the slave in eight-byte records at S14. The master will pause after each eight-byte record, at S15, and wait for an acknowledgment from the slave (S16) so that transmission can proceed. Upon completion of transmission, the master will resume normal operation, at S1. At the slave, the bar graph display will flash at the end, at S17, signifying that the cloning process is complete. The units can now be disconnected and the operation of the new instrument will occur on the next power up. The master and slave will check if data transfer has completed (at S18, S19), and display "percent done" on their bar graphs at S20, S21 until all data has been transmitted. All communication is conducted at 9600 baud.

It will be appreciated that the slave is initially provided with a blank memory, The memory is not physically clear, but the slave just ignores what it has because it is going to receive new data. Any previous data stored will be overwritten. The virgin command at S5 indicates that the master is going to send the entire contents of the memory and any old data is going to be overwritten. The CPU is notified, in effect, that the data is going to be downloaded and that any previous information regarding calibration curves is going to be erased. Typically, the data will be transferred from the beginning of memory and downloading continues to the end until all of the data transfer has been completed.

If the slave sends an upload command, but it doesn't receive the virgin command as a response, it goes into normal operation at S7.

Numerous alterations of the above structures herein discussed will suggest themselves to those skilled in the prior art, however, it is to be understood that the present disclosure relates to preferred embodiments of the invention which are for purposes of illustration only and are not to be construed as limitation of the invention.

I claim:

1. A clonable measurement display instrument for linearly displaying a non-linear input variable at a number of input points over a finite range, comprising input means for receiving digital data representative of a non-linear input variable; computer means connected to said input means for receiving the digital data; a substantially linear display having a display input connected to said computer means for providing an output indication which varies linearly with a signal applied to said display input; non-volatile memory means connected to said computer means for storing a finite set of predetermined calibration points n of correlated input/output (x, $y_n$) which together define a conversion function for converting a given input ($x_n$) at any given point ($x_n$, $y_n$) to an associated output ($y_n$); and cloning interface means cooperating with said microprocessor means for selectively establishing a signal path to said non-volatile memory means, said microprocessor means being programmed to selectively upload from or download to another like display device at least one of said finite sets of predetermined numbers n through said cloning interface means, whereby the data stored in any like clonable display device can be shared with other such devices and any such device can be replaced by any such display device which has been cloned by the downloading of the desired calibration data thereto.

2. An instrument as defined in claim 1, wherein said display comprises an analog meter.

3. An instrument as defined in claim 1, wherein said display comprises a LED bar graph.

4. An instrument as defined in claim 1, wherein said display comprises a digital display.

5. An instrument as defined in claim 1, wherein the input/output points ($x_n$, $y_n$) cover an input range over a linear scale representing 0–100% of the input and an output range over a linear scale representing 0–100% of the output.

6. An instrument as defined in claim 1, wherein the microprocessor is programmed to send a virgin command by the instrument to the clone prior to transfer of data to clear the memory of the clone.

7. An instrument as defined in claim 1, wherein each of the interfaces has a serial port associated therewith, and wherein the microprocessor is programmed to set the transfer rates of the serial ports to high speed during transfer of calibration data.

8. An instrument as defined in claim 1, wherein the microprocessor is programmed to display data transfer to the extent which data has been transferred.

9. An instrument as defined in claim 8, wherein the instrument displays the percent of the total data that has been uploaded to the clone.

10. An instrument as defined in claim 8, wherein the clone displays the percent of the total data that has been downloaded from the instrument.

11. An instrument as defined in claim 1, wherein the microprocessor is programmed to check after transfer of each data point if transfer is complete and proceeding with data transfer only if more data needs to be transferred.

12. An instrument as defined in claim 11, wherein checking is performed by the instrument.

13. The method of creating a clone of a measurement display instrument, wherein the instrument and its clone are each provided with a microprocessor, a non-volatile memory and a data interface for transfer of data to or from the memory under the control of the associated microprocessor, comprising the steps of powering up the instrument to be cloned; connecting the data interfaces of the instrument and clone to each other and powering up the clone; sending an upload command by the clone to the instrument; setting the interfaces of the instrument and clone for transfer of data upon receipt of the upload command; and downloading the data in the non-volatile memory of the instrument to the non-volatile memory of the clone.

14. Method as defined in claim 13, further comprising the step of sending a virgin command by the instrument to the clone prior to transfer of data to clear the memory of the clone.

15. Method as defined in claim 13, wherein each of the interfaces has a serial port associated therewith, and further comprising the step of setting the transfer rates of the serial ports to high speed during transfer of calibration data.

16. Method as defined in claim 13, further comprising the step of displaying contemporaneously with data transfer the extend to which data has been transferred.

17. Method as defined in claim 16, wherein the instrument displays the percent of the total data that has been uploaded to the clone.

18. Method as defined in claim 16, wherein the clone displays the percent of the total data that has been downloaded from the instrument.

19. Method as defined in claim 13, further comprising the step of checking after transfer of each data point if transfer is complete and proceeding with data transfer only if more data needs to be transferred.

20. Method as defined in claim 19, wherein checking is performed by the instrument.

\* \* \* \* \*